B. F. EILERMAN, C. D. GRIMES & T. MAJOR.
VOTING MACHINE.
APPLICATION FILED FEB. 8, 1907.

922,683.

Patented May 25, 1909.
6 SHEETS—SHEET 1.

Witnesses
Frank A. Fahle
Thomas H. McMeans

Inventors
Thomas Major
Charles D. Grimes
Benjamin F. Eilerman
BY
Bradford Hood
Attorneys B. F. EILERMAN, C. D. GRIMES & T. MAJOR.
VOTING MACHINE.
APPLICATION FILED FEB. 8, 1907.

922,683.

Patented May 25, 1909.
6 SHEETS—SHEET 2.

Fig. 3.

B. F. EILERMAN, C. D. GRIMES & T. MAJOR.
VOTING MACHINE.
APPLICATION FILED FEB. 8, 1907.

922,683.

Patented May 25, 1909.
6 SHEETS—SHEET 3.

B. F. EILERMAN, C. D. GRIMES & T. MAJOR.
VOTING MACHINE.
APPLICATION FILED FEB. 8, 1907.

922,683.

Patented May 25, 1909.
6 SHEETS—SHEET 6.

Witnesses
Frank A. Fahle
Thomas W. McMeans

Inventors
Thomas Major
Charles D. Grimes
Benjamin F. Eilerman
By Bradford Hood
Attorneys

UNITED STATES PATENT OFFICE.

BENJAMIN F. EILERMAN AND CHARLES D. GRIMES, OF DAYTON, OHIO, AND THOMAS MAJOR, OF FRANKFORT, INDIANA; SAID EILERMAN AND GRIMES ASSIGNORS TO SAID MAJOR.

VOTING-MACHINE.

No. 922,683.　　　　　Specification of Letters Patent.　　　Patented May 25, 1909.

Application filed February 8, 1907.　Serial No. 356,461.

*To all whom it may concern:*

Be it known that we, BENJAMIN F. EILERMAN and CHARLES D. GRIMES, citizens of the United States, residing at Dayton, in the county of Montgomery, State of Ohio, and THOMAS MAJOR, a citizen of the United States, residing at Frankfort, in the county of Clinton and State of Indiana, have invented certain new and useful Improvements in Voting-Machines, of which the following is a specification.

The object of our invention is to produce a compact mechanism by means of which votes may be properly registered, the mechanism being of such character as to permit the accomplishment of all the necessary functions of such a machine.

The accompanying drawings illustrate our invention:

Fig. 10 a detail on line 10—10 of Fig. 12 of the interlocking mechanism; Fig. 11 a section on line 11—11 of Fig. 12, and Fig. 12 a horizontal section immediately above the interlocking slides; Fig. 13 a section on line 13—13 of Fig. 3; Fig. 14 a section on line 14—14 of Fig. 13.

Figure 3:
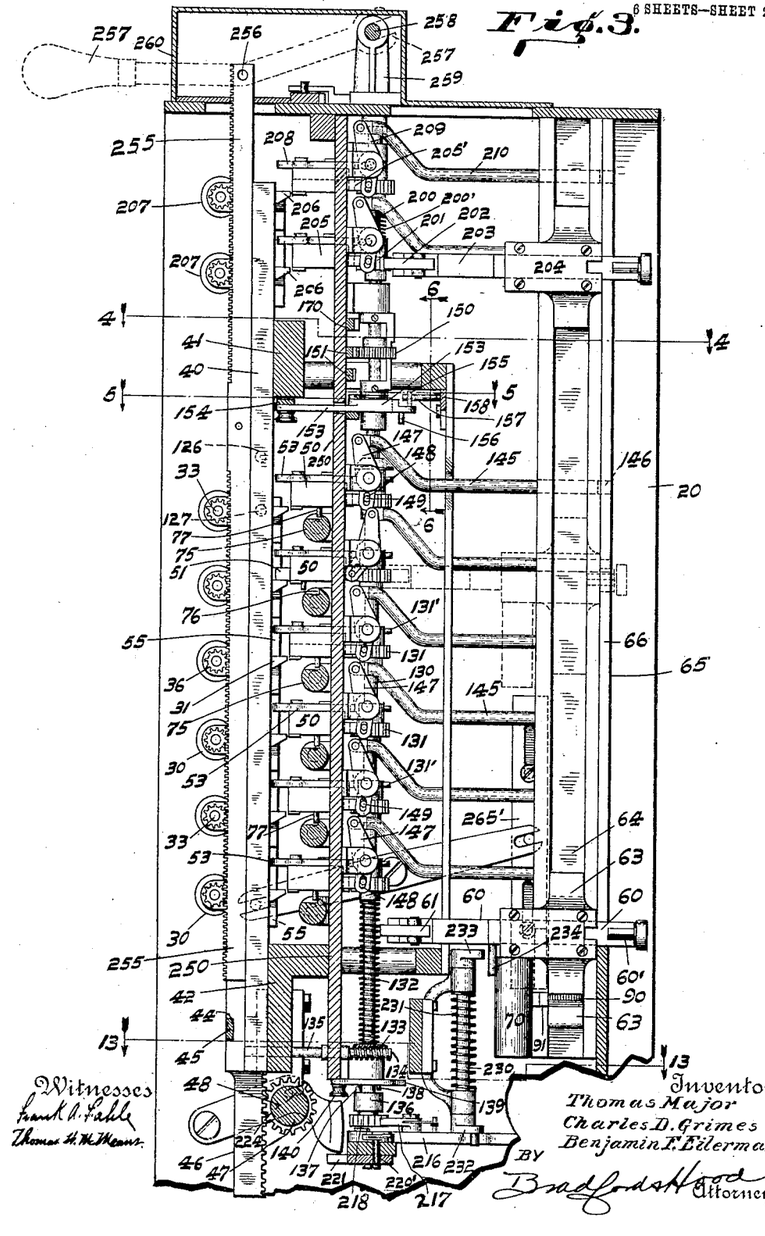
Fig. 3 a vertical section, on an enlarged scale, on line 3—3 of Fig. 1.
Figures 4, 15:
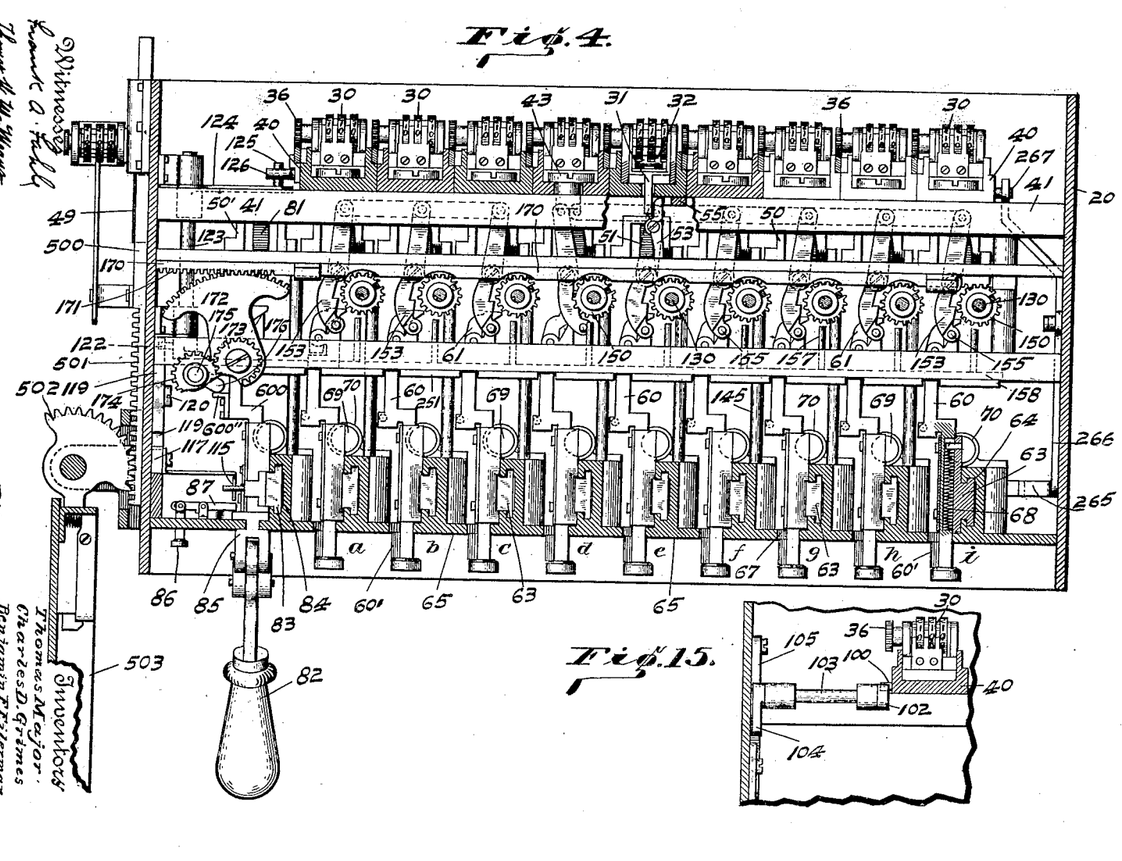
Fig. 4 a horizontal section on line 4—4 of Fig. 3.
Fig. 15 a section on line 15—15 of Fig. 2.

*The counters.*—The counters 30 may be of any desired type but in the present case we have shown them as of an ordinary ratchet type actuated by a lever 31 carrying a spring pawl 32 having teeth of different length adapted to engage the several elements of the counter, each of said elements being provided with a single deep tooth, in the usual well known manner, the arrangement being such that the several elements will be operated in the proper sequence in the usual well known manner. The several counting elements of the counters are journaled upon a shaft 33 provided with a single ratchet tooth 34 adapted to engage a spring plunger 35 (see dotted lines in Fig. 9) carried by each of the counting elements, the arrangement being such that the counting elements may be turned upon their shaft 33 by means of the operating lever, and the several counting elements automatically brought to zero by a rotation of shaft 33. In order to accomplish such rotation of the shaft we provide each shaft with a small pinion 36, the purpose of which will appear. The counters for each office row are arranged as a unit in a carrier 40. The several carriers 40 are arranged side by side in a vertical plane and are slidably mounted upon a pair of cross bars 41 and 42 arranged in the main casing 20, each carrier being held in position by means of headed screws 43 passing through slots in the carriers into the cross bars 41 and 42. Each of the carriers 40 is provided, near its lower end, with a transverse notch 44 (Fig. 3) adapted to receive a bar 45 which thus connects all of the carriers 40 together for simultaneous movement. Secured to one or more of the carriers 40, at the lower ends thereof, is a rack bar 46 adapted to mesh with a corresponding gear 47 carried by a main shaft 48. This shaft 48 projects at one end from the casing and is provided on that end with a gear 49 (Fig. 4) meshing with a reciprocating rack bar 500 having suitable teeth on its under edge. The rack bar 500 is also provided on its outer face with teeth 501 adapted to mesh with a segment 502 carried by a swinging gage 503 which the voter must swing from the position shown in Fig. 4 to a position at right angles thereto, in order to properly register his vote, this movement of the gate serving to rotate shaft 48 so as to move all of the carriers 40 upwardly from the position shown in Fig. 3. The ends of levers 31 are projected through their carriers 40 as shown at the middle of Fig. 4 and in Fig. 3.

Figures 7, 8, 9:
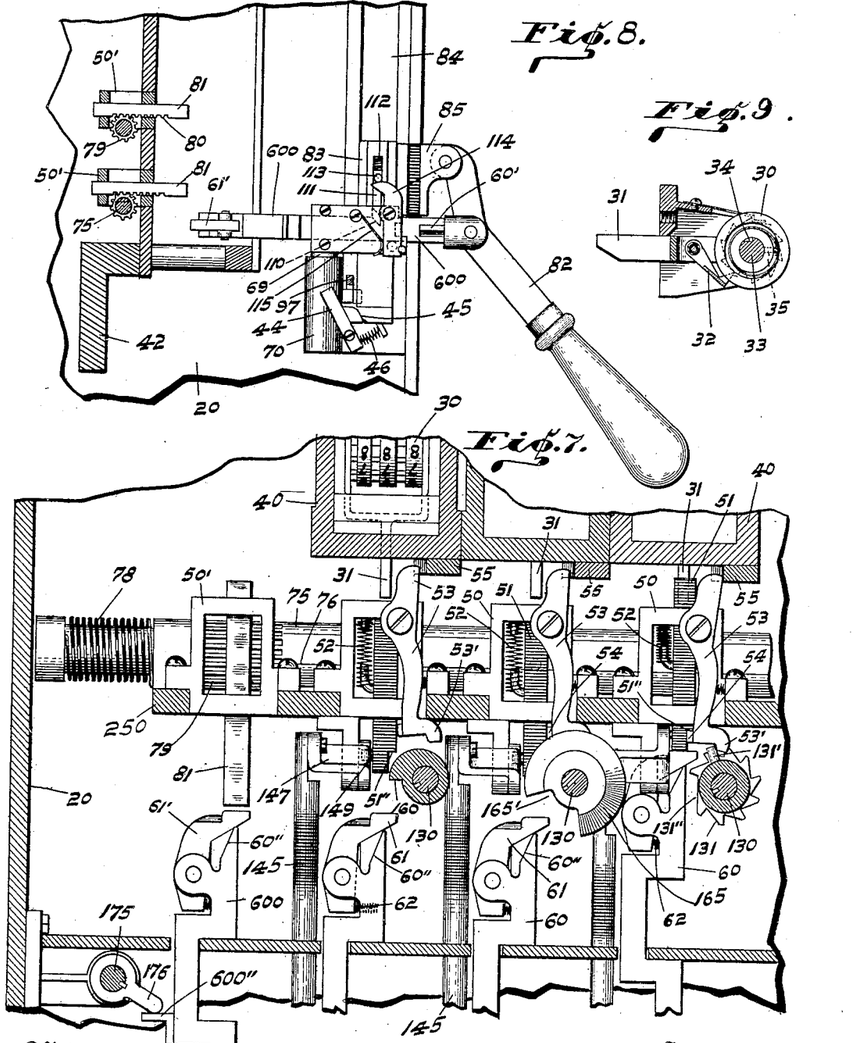
Fig. 7 a horizontal section on an enlarged scale, in fact, about full size, on line 7—7 of Fig. 6.
Fig. 8 a side elevation of the straight ticket key and associated parts.
Fig. 9 is a sectional detail of one of the counters.

*The counter actuating mechanism.*—Arranged adjacent the projected end of each counter lever 31 is a casing 50 within which is reciprocably mounted a sliding counter-actuating finger 51 which may be projected immediately above the corresponding counter lever 31. Finger 51 is normally held retracted and out of the path of movement of its counter lever 31 by means of a light spring 52 (Fig. 7). In order to cast a vote it is necessary to project the corresponding finger 51 into the path of movement of the proper counter lever 31 and the finger, when so projected, must remain projected until the counter carriers 40 have been carried through their vote registering movement. For this purpose, therefore, we pivot, upon each casing 50, a catch lever 53 which, at its forward end, is provided with a lug 54 (Fig. 7) adapted, when the finger 51 is projected (as at the right hand end of Fig. 7) to pass behind a shoulder 51' formed on said finger, thus holding the finger projected. The rear end of each catch lever 53 is arranged in the path of movement of one of a corresponding number of cams 55 carried by the counter carriers 40, the arrangement being such that, when the counter carriers are projected upwardly, said cams will engage those catch levers which have been thrown to the position shown at the right of Fig. 7, and move them back to normal position so as to release the fingers 51 which have been projected.

*The setting mechanism.*—In order to set the actuator-fingers 51 in position to actuate the corresponding counter levers 31, we provide a series of office keys or selectors, *a, b, c, d, e, f, g, h,* and *i,* one for each vertical series of counters. Each of these office selectors consists primarily of a horizontally reciprocable plunger 60 which, at its inner end, is provided with a horizontally swinging pawl 61 held yieldingly to its position by a light spring 62, the pawl 61 having its squared outer end arranged in the vertical plane of the corresponding vertical series of fingers 51, so that, by bringing a plunger 60 into horizontal alinement with one of the fingers 51, such finger may be projected to voting position by a horizontal inward movement of the plunger 60, the inner end of the pawl 61 engaging the corresponding finger 51 and projecting it inward against the action of its spring 52. In order to facilitate the vertical positioning of the plunger 60, we mount it in a carrier 63 which, in turn, is slidably mounted in a grooved way 64, said grooved way being formed in the inner face of a plate 65. The plates 65 are adapted to be arranged in a series, separated slightly one from another so as to form a series of vertical slots 66 in which the projected outer ends of the plunger 60 may travel. In order to further facilitate the horizontal positioning of the plunger, we form, in one vertical edge of each plate 65 a series of notches 67 into which a rib 60', formed on one vertical face of the plunger 60, may be projected, the arrangement being such that the plunger 60 may not be projected inwardly until its rib 60' has been brought into registry with one of the notches 67. The plungers 60 are normally held in their outward position by means of a spring 68 (Fig. 4) arranged within the carrier 63. In order to prevent injury to the carrier 63 in case it should be released by the voter and allowed to drop from the upper end of its possible position, we provide each carrier 63 with a vertical piston 69 (Figs. 4 and 8) adapted to enter a dash pot 70 arranged at the lower end of the travel of the carrier.

*The straight ticket mechanism.*—In order that all of the fingers 51 of a horizontal series, *i. e.*, a party row, may be simultaneously projected to voted position by a single means, we arrange beneath each horizontal series of casings 50, a rock-shaft 75 which is provided with a single longitudinal shoulder 76 adapted to engage a pin 77 projected downwardly from each finger 51, the arrangement being such that each finger 51 and its pin 77 may be moved freely independently of the rock-shaft 75 but, when the rock-shaft is turned, the shoulder 76 thereof will simultaneously engage all of the pins 77 and thus simultaneously project the corresponding fingers 51 to voted position. Each rockshaft is yieldingly held in position by means of a returning spring 78 and, in order to actuate each rock-shaft, we provide it, at one end, with gear teeth 79 (Figs. 7 and 8) adapted to receive the teeth 80 of a plunger 81. Each plunger 81 is carried in a casing 50' similar to the casings 50 and are arranged in vertical series, one plunger 81 being provided for each straight ticket shaft 75. In order to actuate the plungers 81, we provide a straight ticket plunger 600 provided at its inner end with a pawl 61'. The plunger 600 is substantially like the office plunger 60 but, in view of the fact that a greater amount of power is required to simultaneously operate all of the fingers 51 of a party row than is required to operate a single one of said fingers, we have deemed it advisable to provide a lever 82 (Fig. 8) by means of which the straight ticket plunger 600 may be operated. In order to do this we provide the following mechanism. The plunger 600 is carried in a vertically reciprocable carrier 83 which is mounted in a guideway 84, like the guideway 64, and mounted so as to slide in the vertical slot 66', through which the straight ticket plunger projects, is a slide block 85 to which the lever 82 is pivoted, the lever 82 being pivoted to the plunger 600, as clearly shown in Fig. 8. The plunger 600 is provided with a rib 60' like the corresponding ribs on the plungers 60 and this rib must be brought into registry with the corresponding notches 67 formed along the slot 66', in the manner already described in connection with the office plungers.

There are some voters who may be so feeble or so uncertain in the control of their hands that it will be difficult for them to readily position the plungers in exact registry with the notches 67, and means may be provided to facilitate this positioning, if desired. We have shown such a means in connection with the straight ticket plunger. For this purpose we provide a series of push pins 86 (Fig. 4), one for each notch 67 in the straight ticket row. Each of these push pins engages a lever 87, one end of which may be projected into the path of movement of the slide 85 and stop said slide in proper position to bring the rib 60' of plunger 600 into registry with the corresponding one of notches 67. It will be readily understood that a similar set of push pins might be arranged in conjunction with each of the office plungers, if desired.

*The interlocking mechanism.*—It is necessary in this type of a machine that the voter be able to move any one of the office plungers from normal to voting position freely, even though the straight ticket plunger has been operated, although provision must be made that no office plunger may be moved until all of the office plungers are in normal position. If an office plunger is moved it preferably should not be possible for the same voter to operate the straight ticket plunger. The interlocking mechanism which we have provided, therefore, provides means to accomplish these ends.

Each of the carriers 63 is provided at its lower end, upon its opposite sides, with a pair of notches 90 adapted to receive correspondingly shaped ends of interlocking blocks 91 which are arranged to slide transversely of the line of movement of the carriers 63. The entering ends of blocks 91 are tapered on their lower corners and the lower sides of the notches 90 are correspondingly tapered, in the usual well known manner, the entering ends of the interlocking blocks lying a distance apart less than the full width of the lower end of carrier 63 and a distance greater than the distance between the bottoms of the opposed notches 90, the arrangement being such that, when any one of the carriers 63 is moved upwardly, its lower end will be brought between the adjacent entering ends of the interlocking blocks and force the same apart, thereby forcing the interlocking blocks into the corresponding notches of all of the other carriers. Each interlocking block is provided with an extension 92 which passes behind the adjacent carrier 63 and engages the adjacent end of the next interlocking block at 93 so that motion of any block will transmit corresponding motion to those blocks which are beyond it. With the construction thus far described, the unmoved carriers 63 would only be prevented from movement so long as the lower end of the moved carrier remained between the adjacent interlocking block, and it would thus be necessary to provide the carrier with a lower end as long as the full vertical stroke of the carrier. This would be inconvenient, and in order to eliminate such necessity we provide, between each pair of interlocking blocks, a swinging locking finger 94 which, when the adjacent interlocking blocks have been separated, as shown at "X" in Fig. 12, will be moved by its spring automatically between the separated ends thereof and thus prevent any movement of any of the interlocking blocks until the moved carrier 63 has been returned to its normal position. Whenever a carrier 63 has been returned to its normal position its lower end will engage a cam finger 95 carried by the locking finger 94 to move said locking finger out of locking position, thus releasing the entire train of interlocking blocks so that any of the office plungers may be moved upward to voting position.

Figure 2:
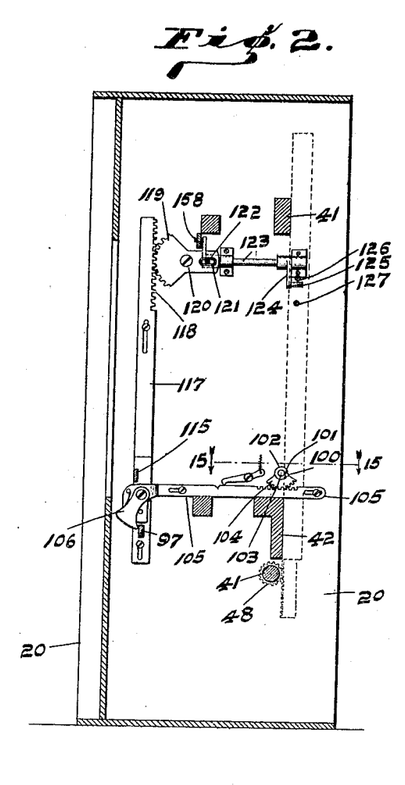
Fig. 2 a vertical section on line 2—2 of Fig. 1.
Figures 10, 11, 12, 13, 14:
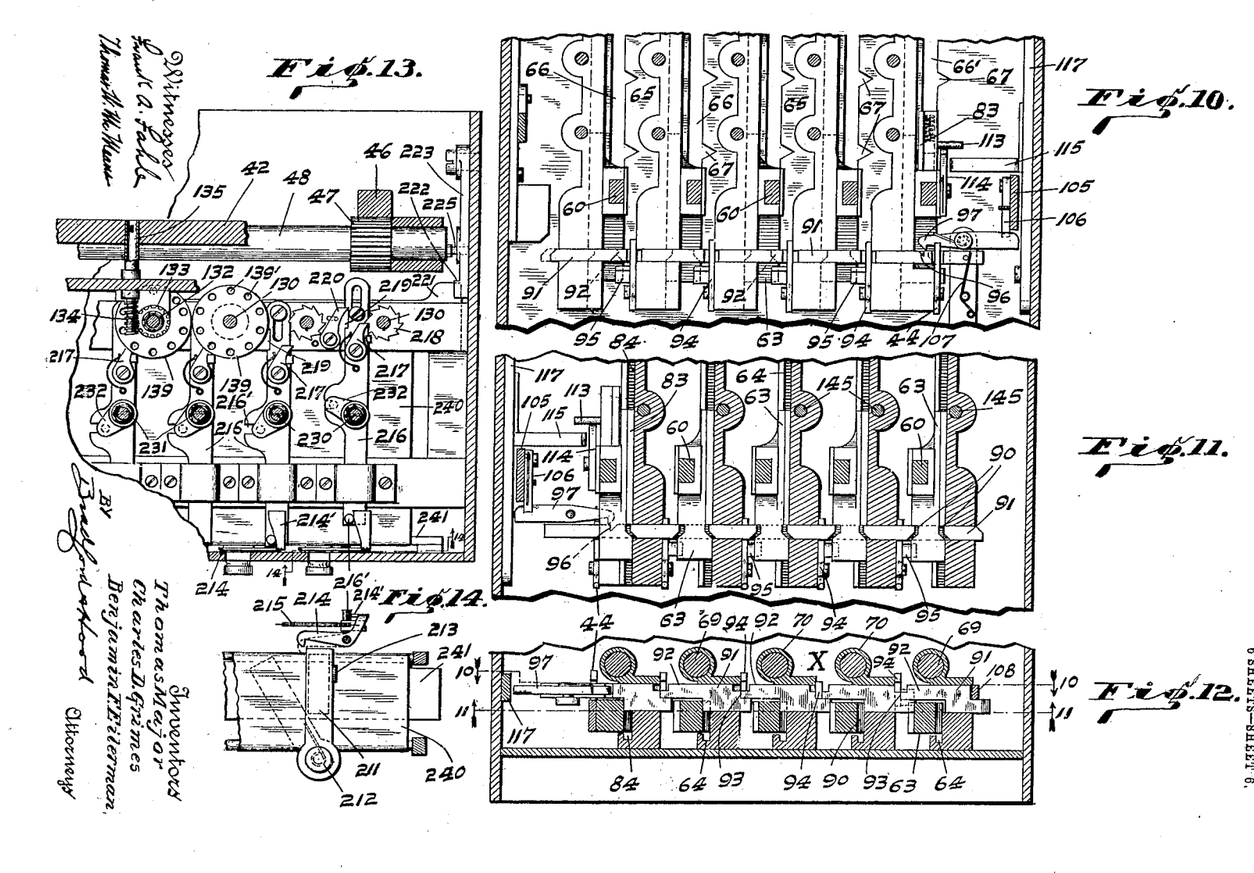

We deem it advisable, whenever an office plunger has been operated, to prevent the operation of the straight ticket plunger, yet the construction must be such that an upward movement of the straight ticket plunger will not prevent a subsequent operation of any office plunger, so soon as the straight ticket plunger has been returned to normal. In order to accomplish this result we provide that interlocking block 91 which lies immediately adjacent the straight ticket plunger, with a notch 96 which is adapted to receive the hooked end of a latch 97, the arrangement being such that, when any office plunger has been moved upwardly, the interlocking block adjacent the straight ticket plunger will be moved so as to bring notch 96 into position to receive latch 97 and this latch will prevent any return of that interlocking block so that said interlocking block, as it lies within the notch 90 of the straight-ticket-plunger carrier, will prevent any upward movement of the said carrier. The hook 97 is not released until after the voter leaves the machine and actuates the door 53, and when this occurs the counter-holders 40 are reciprocated in the manner already described. The first counter-holder 40 carries a pin 100 (Figs. 2 and 15) which engages a notch 101 formed in a collar 102 carried by a shaft 103. Shaft 103 carries a segment 104 which meshes with teeth formed on a slide 105 which, at its forward end, is provided with a pawl 106 adapted to engage one end of the hook lever 97. The pawl rides over the lever in one direction but operates upon the lever in the other direction, as clearly shown in Fig. 2. As soon as pawl 97 is withdrawn, the straight ticket interlocking block is automatically moved by a spring 107 (Fig. 11) to a position where notch 96 is no longer in position to receive hook 97. Movement of the furthermost interlocking block 92, *i. e.*, that most distant from the straight ticket key, is prevented in one direction by a plate 108 (Fig. 12).

It is desirable, although not absolutely essential, that the voter be prevented from operating the straight ticket plunger more than once, and in order to accomplish this result we provide the straight ticket plunger, in its upper side, with a notch 110 (dotted lines Fig. 8) and arranged above the plunger is a locking bolt 111 normally urged downward by a spring 112. Bolt 111 carries a transversely projecting pin 113 beneath which normally lies the upper end of a pivoted catch 114. The opposite end of catch 114 is arranged in the path of movement of the rib 60' of the plunger 600 and the catch is normally held in the position shown in Fig. 8 by a light spring 115, the arrangement being such that, when the plunger 600 is pushed inward, its rib 60' will engage the catch and swing it out from beneath pin 113, thus permitting spring 112 to drive bolt 111 down upon plunger 600, whereupon when plunger 600 is returned to its normal position, the bolt 111 will drop down into notch 110 and prevent a return movement of plunger 600. When the exit gate is manipulated a finger 115 (Figs. 2, 4 and 11) is raised up beneath pin 113 so as to raise bolt 111 until latch 114 passes again beneath pin 113, thus restoring the parts to normal. Finger 115 is carried by a vertically reciprocating bar 117 having teeth 118 (Fig. 2) at its upper end. The teeth 118 mesh with a segment 119 pivoted at 120. One arm of the segment 119 is provided with a slot 121 adapted to receive a pin 122 carried by a rock shaft 123, said rock shaft having a crank arm 124, the pin 125 of which is engaged by either one of two pins 126 and 127 carried by the adjacent counter carrier 40.

*The retracting mechanism.*—We deem it advisable to so construct the machine that those portions of the machine which may be manipulated by the voter, i. e., the office plungers or keys, may be at all times, when accessible to the voter, freely movable, the construction being such, however, that repeated manipulation of the candidate plunger at any given point serves only to set the voting mechanism without casting a vote. We have also provided means by which, if the voter has set the mechanism to cast a vote for a particular candidate and then desires to "scratch", he may do so merely by voting for the other candidate for the same office for whom he desires to vote, this action automatically retracting the mechanism previously set, and this automatic action being accomplished by a mechanism wholly free and independent from the interlocking mechanism. To accomplish this result we arrange a shaft 130 for each vertical row of counters, and mount thereon a series of ratchet wheels 131, one for each counter-actuating plunger 51 in that vertical series, said ratchet wheels being arranged in such position that the pawl 61 of the corresponding office plunger 60 must traverse a ratchet wheel before it can reach the corresponding finger 51, thus advancing the shaft 130 one step. It will be seen, therefore, that shaft 130 may be advanced repeated steps by repeated reciprocation of an office plunger unless some means is provided to prevent such action. In order to accomplish this result we secure to each shaft one end of a torsional spring 132 the other end being attached to a worm-wheel 133 which may be actuated by a worm 134 carried by a shaft 135 accessible from the rear of the machine, said spring 132 tending to return the shaft to a normal position as soon as released by the pawl 61, which travels past the ratchet 131, as clearly shown at the right of Fig. 7. In order to form a stop for the shaft 130 we mount upon its lower end a collar 136 (Fig. 3) provided with a pin 137 which lies parallel with the axis, and this pin is adapted to come into engagement with a pin 138 carried by a disk 139 (Fig. 13). Disk 139 is rotatably adjustable and held in any desired position of adjustment by a screw 140, a plurality of equally spaced screw-receiving holes 139' being formed therethrough, for a purpose which will appear hereafter.

As already described, whenever an office plunger is moved inwardly its pawl 61, after passing the corresponding ratchet wheel 131 and actuating its shaft 130, comes into engagement with the alined sliding finger 51 and projects said finger to the rear until its latch 53 passes in behind the shoulder 51', thus holding the finger 51 projected. In order to automatically retract any voted finger 51 as soon as an attempt is made to move another finger 51 in the same vertical series to voted position, we provide the hub of each ratchet wheel 131 with a radial pin 131' (Figs. 3 and 7) which, whenever a shaft belonging to a single-office series, is operated by its pawl 61, will be brought into engagement with a projection 53' formed on the front end of each latch 53 and withdraw the portion 54 of the latch from behind the shoulder 51' of a previously voted finger 51, thus releasing said finger. Each ratchet wheel 131 is provided with a long space 131" (Fig. 7) which comes to position to receive the corresponding pawl 61 just as pin 131' comes into engagement with the end 53' of the corresponding latch 53 (right of Fig. 7) so that another operation of the right hand plunger 60 in Fig. 7 will serve to rotate the shaft 130 just enough to cause pins 131 to withdraw the catches 53. All of the ratchets 131 of any shaft 130 are arranged so that the spaces 131" are in vertical alinement. It will be noticed that this releasing mechanism is entirely independent of any interlocking mechanism so that any amount of force which may be applied to the inward pushing of any office plunger cannot in any manner serve to injure the mechanism, as no unusual force can be transmitted thereto.

*The indicating mechanism.*—In order that the voter may be advised whenever he has pushed a finger 51 to voted position, we provide an indicator for each finger 51, said indicator consisting of a plunger 145 which is projectable through an opening 146 in the face plate so as to expose its end at the face of the machine. Each plunger is connected to one end of a lever 147, the opposite end of said lever being provided with a slot 148 adapted to receive pin 149 carried by the adjacent actuator finger 51, the arrangement being such that, whenever a finger 51 is projected to voted position and held therein by its catch 53, the corresponding indicator plunger 145 will be projected so as to be visible at the face of the machine and be held in that position as long as its finger 51 is held in voted position. As soon as catch 53 is withdrawn the voted finger 51 will be withdrawn from voted position by its spring 52 and the indicator thus automatically withdrawn.

*The grouping mechanism.*—It is desirable that any two or more vertical series of counters and counter-actuating and setting mechanisms may be connected to form a group which will permit the selection from the entire group of any desired number of counter-actuating fingers 51 wholly irrespective of their relative arrangement. We have, therefore, provided means to accomplish this result, said means retaining the characteristic that any attempt to vote a greater number of candidates than is arranged for in the group, cannot operate to subject the mechanism to an unusual stress, the arrangement being also such that, whenever an attempt is made to vote for an excessive number in a group, all mechanisms previously carried to voting positions in a group will be automatically released and returned to unvoted position. We also provide means in connection with the group mechanism whereby, whenever an excess vote in a group has been attempted, the mechanism for that group will be carried to such a position that subsequent repeated operations of any office plunger in the group will be unable to permanently set any finger 51 in voted position in the group until after a selected and predetermined one of the office plungers in the group shall have been carried to an unusual and otherwise unattainable position and there operated to release the group mechanism and return its various parts to normal, whereupon the voter may then proceed, as originally, to set the proper number of fingers 51 in the group. The mechanism for accomplishing these results is as follows: Splined upon each shaft 130 (in the present instance near its top) is a gear 150 (Figs. 3 and 6) which may be slipped axially upon the shaft and brought into mesh with any one of a number of rack bars 151 which are arranged to move transversely of the several shafts 130 and parallel with the face of the machine. In the present instance we have shown two such racks, thus making it possible to make, in the machine illustrated, two different groups with any desired combination of shafts 130. It will be readily understood, of course, that the number of rack bars 151 may be increased without departing from our invention. Mounted upon each shaft 130 is a ratchet wheel 152 provided with as many teeth as the greatest number of shafts 130 to be formed in a group. Arranged in position to coöperate with each of the ratchet wheels 152 is a spring pawl 153. The rear ends of which pawls 153 are projected in position to be connected by a link, or links, 154 so that, when desired, they may be connected to these links, or to any other means, in such manner as to be withdrawn from coaction with their respective ratchet wheels 152, as shown at both ends of Fig. 5. Each pawl is provided with a pair of pins 155 and 156. Pin 155 projects upwardly from the end of the pawl and is adapted to be engaged by one of a series of pins 157 carried by a bar 158, which is connected to the wrist pin of a crank 159 (Fig. 5) carried by shaft 123 so that, when said shaft is reciprocated by the action of the exit door in a manner already described, bar 158 will be drawn to the left (Fig. 5), so as to withdraw any of the pawls 153 which may be in active position. The pin 156 projects downwardly from the forward end of the pawl 153 and lies in position to be engaged by the cam surface 60″ of the corresponding office plunger 60 said cam also serving to withdraw the pawl from engagement with its ratchet.

Figure 1:
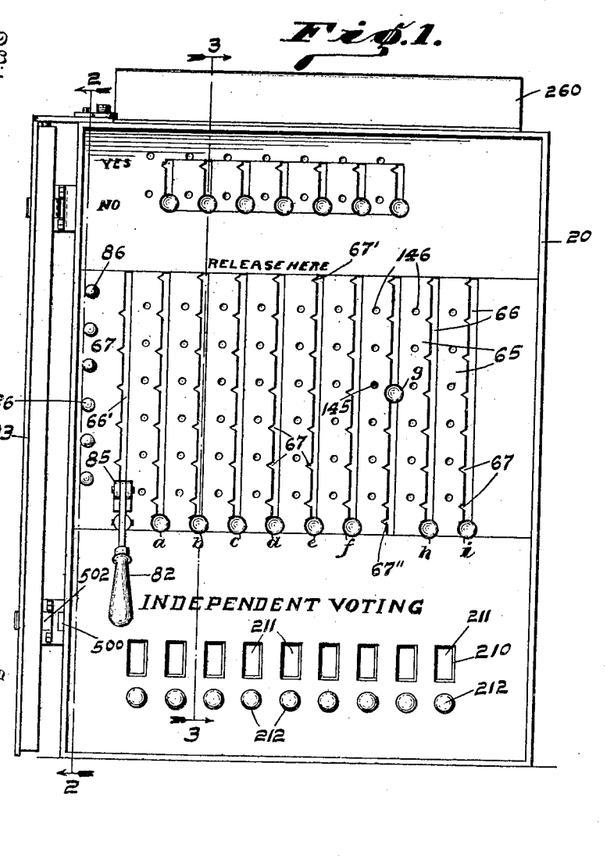
Figure 1 is a front elevation.
Figure 5:
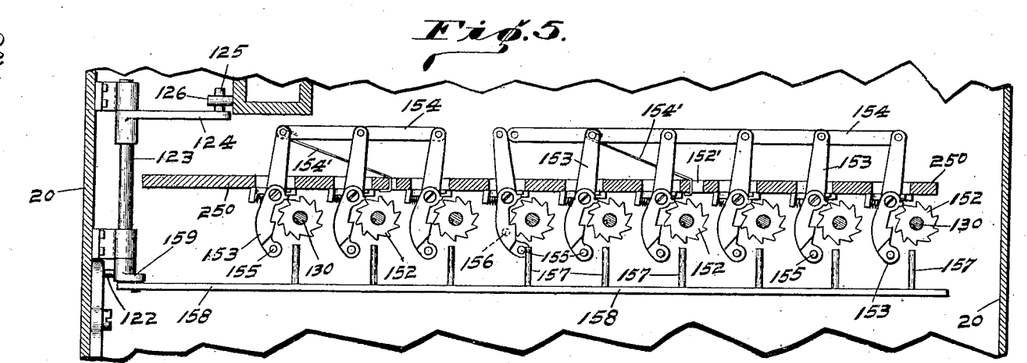
Fig. 5 a horizontal section on line 5—5 of Fig. 3.
Figure 6:
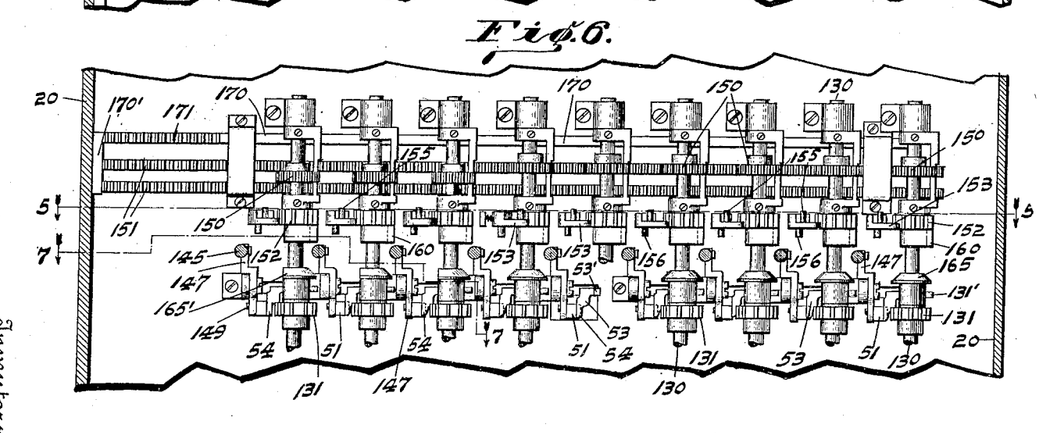
Fig. 6 a vertical detail on line 6—6 of Fig. 3.

In the drawings we have shown a group of six, at the right of Fig. 5, and in the formation of this group five of the pawls 153 of the group are connected to a link 154 and withdrawn from active position and the gears 150 of these six shafts have been moved upwardly until they mesh with the upper one of the rack bars 151, thus connecting them so that, if any one of the shafts is rotated, they will be all equally affected in the same direction. Before the gears 150 are moved up into engagement with the proper rack bar 151 each of the disks 139, of the six shafts 130 involved, is shifted (by bringing the proper hole 139′ in position to receive screw 140) until pin 138 thereof lies in such position that the pins 137 of the shafts 130 will engage pins 138 six steps from the position which will bring the pins 131′ of the involved shafts 130 into position to engage the corresponding latches 53 (as shown at the right of Fig. 7) and which will also bring the spaces 131″ in alinement with pawls 61. Mounted upon each shaft 130 is a single tooth 160 which will be brought into alinement with the corresponding plunger pawl 61 whenever the desired number of fingers 51 have been set in a group. We deem it advisable to prevent the candidate plungers 61 from being carried to a position where they may operate upon the tooth 160 until a certain position of the mechanism has been reached, and we therefore provide each shaft 131 with a rotatively adjustable collar 165 (Figs. 6 and 7) which ordinarily will lie in the path of vertical movement of a corresponding plunger-pawl 61 and prevent said plunger from reaching a vertical position high enough to bring its rib 60' into horizontal alinement with the uppermost notch 67' (Fig. 1). These collars 165 are provided, however, with a notch 165' which, when the desired number of slides 51 have been actuated in the group, will come into registry with the path of vertical movement of a plunger pawl 61 so that it may be moved up through said gap and into horizontal alinement with the tooth 160.

The operation of the group mechanism is as follows: After the group has been formed, as previously described, the voter may raise any one of the candidate plungers in the group to any one of its several horizontal voting positions and, by pressing said plunger inward, may propel the corresponding finger 51 to voted position, said finger being held in voted position by its latch 53. Each actuation of a candidate plunger in a group serves, by reason of the connecting rack 151, to simultaneously actuate all of the shafts 130 in a group, step-by-step, until the desired number of fingers 51 have been projected to voted position, at which time the long gap 131" of all the ratchets 131 have been brought to a position where they are opposite the lines of horizontal travel of pawls 61 of the group so that a further advance of the shafts 130, by an excessive inward movement of one of the candidate plungers of the group will only be sufficient to drive the pawls 131' against projections 53' of those latches 53 which are retaining the voted fingers 51 so that an excessive movement of any one of the shafts 130 serves to automatically withdraw all of the latches 53 which are retaining voted fingers 51, and thus releasing said fingers allowing them to be returned to normal position by their springs. Subsequent actuations of any one of the candidate plungers in the group will cause the pins 131' to so act upon the latches 53 that no one of the fingers 51 in the group can be retained in voted position. It then becomes necessary for the voter to operate that one of the voting plungers in a group which has been selected, moving the same vertically upward and carrying its pawl 61 upward through the gap 165' of collar 165 until said pawl is brought into horizontal alinement with the tooth 160, and into such position that the cam 60" of said plunger may be brought into engagement with the pin 156 of that pawl 153 which is in active position for the group so that, when the candidate plunger is pushed inward at this position it will withdraw the active pawl 153 from its ratchet 152 and thus permit the several springs 132 of the shafts 130 in the group to return them all to normal, the rack 151 of the group being also thereby returned to normal. If, in voting in a group, the voter has made a mistake, he may, if he desires, continue until he has voted the desired number in the group, and then, instead of attempting an excess vote, he may carry the proper candidate plunger of the group to release position, at which time, when he presses said plunger inwardly to withdraw the active pawl 153, the plunger pawl 61 will engage the single tooth 160 in alinement therewith, and serve to rotate the several shafts 130 sufficiently to bring the several pins 131' into engagement with the actuated catches 53, thus automatically withdrawing all of the votes in the group and restoring the several parts to normal, whereupon the voter may proceed in the manner already described, to again make his selection in the group.

In Fig. 5 we have shown the first three shafts 130 as independent each of the other, their several pawls 153 being connected together and held out of active position by means of a holder 154'. In case a straight ticket is voted, it is necessary to actuate the several shafts 130 of a group through their full possible group movement in order that it may not be possible for the voter, after having voted a straight ticket, to make additional selections in the group. For this purpose we have provided a bar 170 which lies parallel with the rack bars 151. This bar 170 is provided with a finger 170' which projects downwardly at the ends of the several rack bars 151 so that, when the bar 170 is moved to the right, (Fig. 6) its finger 170' will serve to drive all of the rack bars 151 to the right to the end of their complete movement. In setting the machine for several groups each rack bar 151 will be set that number of steps from the right hand end of its complete movement (Fig. 6) equal to the number of candidates to be voted for in the particular group, so that the finger 170' will come into successive engagement with the different rack bars of each group. Bar 170 is provided at one end with a rack 171 which meshes with a segment 172 provided with a pinion 173. Pinion 173 meshes with a pinion 174 carried by a vertical shaft 175 which is provided with a series of radial fingers 176, one for each party row, the arrangement being such that when plunger 600 is pushed in to vote a "straight" ticket a projection 600″ will engage the corresponding finger 176 so as to turn shaft 175 and thus shaft bar 170 and the rack bars 151 to voted position so as to prevent any subsequent manipulation of office plungers in any groups.

*The yes-and-no section.*—In order to equip the machine for voting "Yes" or "No" upon a plurality of questions, we provide a series of vertical shafts 200 which are like the shafts 130. Each of these shafts is provided with a pair of ratchet wheels 201 adapted to be actuated by the pawl 202 of a voting plunger 203 carried in a vertically reciprocable carrier 204. Arranged in alinement with each ratchet wheel 201 is a casing 205 in which is mounted a sliding finger 205′ like the sliding finger 51 of the casings 50, said sliding fingers being adapted to be projected in the path of movement of the counter lever 206 of the corresponding counter 207. Each casing 205 is equipped with a latch 208 like the latch 54. Each finger 205′ actuates a lever 209, to which is connected an indicator 210, which is projectable through the face plate of the machine. Each shaft 200 is normally returned to initial position by a spring 200′. Each of the ratchet wheels 201 carries a projecting radial pin like the pin 131′ of ratchet wheels 131 which will be brought into engagement with the corresponding latch 208 so that, whenever one of the voting plungers 203 is actuated, it will serve to project the alined finger 205′ and simultaneously release the latch 208 of the other finger 205 of the section, in exactly the same manner as has been described in connection with the office voting mechanism. The construction of the yes-and-no apparatus is substantially identical with the construction of any one of the office voting mechanisms, and therefore needs no further description.

*The independent voting mechanism.*—Formed through the face plate of the machine is a plurality of openings 210, each of which is normally covered by an interior cover-plate 211 carried by a rock-shaft journaled in the face plate and provided at its outer end with an operating knob 212. Plate 211 is normally urged against a stop 213 to a position to cover the opening 210, by means of a light spring (dotted lines Fig. 14). When in closed position the plate 211 is engaged by a hook 213 held in engaging position by means of a light spring 215, the arrangement being such that the hook 214 normally prevents any withdrawal of plate 211 from the opening 210. Hook 214 carries a cam finger 214′ adapted to be engaged by a pin 216′ of the independent plunger 216. Plunger 216 carries a pawl 217 adapted to engage a ratchet wheel 218 secured to the lower end of the adjacent shaft 130, and the plunger is provided in one edge with a notch 219 which, when the plunger is projected inward so as to cause a movement of ratchet 218, will permit the entrance of the end of a locking pawl 220. Each pawl 220 carries a pin 220′ (Fig. 3) which projects downward into a slot formed in a sliding bar 221 adapted to be actuated endwise in order to withdraw pawls 220 from locking engagement with any of the plungers 216 which may have been actuated so as to permit the return of said plungers to normal position. In order to actuate bar 221, we provide a cam 222 carried by a lever 223 pivoted to the main casing and provided at an intermediate point with a slot 224 (Fig. 3) to receive an eccentric pin 225 (Fig. 13) carried by the counter-carrier actuating-shaft 48. In order to actuate each independent plunger 216, we provide adjacent thereto a rock shaft 230 automatically returned to normal position by means of a spring 231 (Fig. 3). Shaft 230 carries a crank 232 at its lower end, the wrist pin of said crank lying within a notch 216′ (Fig. 13) formed in the edge of the adjacent plunger 216. The upper end of shaft 230 carries an arm 223 adapted to be engaged by a pin 234 carried by each of the office plungers 60. Formed at the lower end of each slot 66 is a notch 67″ like the notches 67 and adapted to receive the rib 60′ of the corresponding candidate plunger 60 so that, when the plunger 60 is operated in this position, its pin 234 will engage arm 233 so as to rock shaft 230 and drive the corresponding plunger 216 to the position shown at the right of Fig. 13, this movement causing a single step of advancement of the adjacent shaft 130 in exactly the same manner as an actuation of any of the ratchet wheels 131 would. The inward movement of the plunger 216 brings its pin 216′ into engagement with the cam 214′ of latch 214, thus withdrawing said latch to the position shown in full lines in Fig. 14, whereupon the voter may actuate the corresponding knob 212 so as to withdraw the plate 211 from opening 210 and thus permit him to write upon the independent ballot sheet 240 which is carried over the platen 241 immediately back of the series of openings 214. Paper 240 may be actuated in any desirable manner. As soon as the voter releases the knob 212 the plate 211 is immediately returned to a normal position by its spring so that, when the pawl 220 is withdrawn from locking position and plunger 216 is returned to normal position by spring 231, the latch 214 will immediately drop to the position shown in dotted lines in Fig. 14, and thus lock the plate 211 from subsequent withdrawal unless its corresponding plunger 216 is again actuated in the manner already described.

*Protective construction.*—The slots 66 and

66' being open and giving access to the interior of the machine, we deem it advisable to provide means to prevent improper manipulation of the setting mechanism, although any manipulation of any of the mechanism accessible through slots 66 or 66' could not possibly affect the ultimate vote for the reason that the counter-actuating levers 31 lie wholly behind a practically continuous plate 250 (Fig. 3) through which there are no openings except those which are out of alinement with the levers 31 and thoroughly protected. We deem it advisable, however, to horizontally offset a portion of each of the plungers 60, 203 and 600 (as shown in plan in Fig. 4) and the spaces between these offset portions are filled with vertical plates 251 which, therefore, lie in immediate alinement with the slots 66 or 66'.

*The re-setting mechanism.*—In order to rapidly reset the counters to zero, we provide each counter-carrier 40 with a rack bar 255 which meshes with all of the counter gears 36 in that series and this rack bar is projected upwardly through an opening in the top of the machine and provided in its upper end with a hole 256 adapted to receive a pin carried by a removable lever 257 shown in dotted lines in Fig. 3. Lever 257 is provided in its end with a slot 257' adapted to receive a bar 258 and the exposed upper ends of rack bars 255 are covered by a cover 260 which is locked in position. When, however, the machine is to be set to zero the cover 260 is removed and the lever 257 placed (in the position shown in dotted lines in Fig. 3) successively in engagement with each of the rack bars 255 and said rack bars moved upwardly thus causing a complete rotation of all of the counter shafts 33, so as to cause the shoulders 34 thereof to engage the ends 35 of the counter elements 30 and rotate them sufficiently to bring them all to zero position. This resetting may be accomplished very rapidly of course.

*The general locking.*—In order to lock all of the voting plungers against operation until the entrance gate 503 is in proper position, we provide a cam 265 adapted to engage the right hand end of the right hand interlocking block 91 (in Fig. 12) so as to project all of the interlocking blocks into one of the notches 90 of their adjacent plunger-carriers. Cam 265 is conveniently carried by a slide 265' connected to one end of a lever 266, the opposite end of which is engaged by a pin 267 carried by the right hand one of the counter-carriers 40, the lever 266 being thus actuated by the vertical movement of the counter-carriers caused by the rotation of shaft 48 due to a swinging of gate 503 in the manner already described.

We claim as our invention:

1. In a voting machine, the combination, of a series of counter-actuating elements, a single means for selecting and actuating any one of said elements, independent means for retaining the counter-actuating elements in counter-actuating position, and means actuated by said single means for automatically withdrawing the retaining means, other means for withdrawing the retaining means, a series of counters, and means for causing an actuation of those of said counters corresponding to the actuated counter-actuating means.

2. In a voting machine, the combination, of a series of counter-actuating elements, a single means for selecting and actuating any one of said elements, means for retaining the counter-actuating elements in counter-actuating position, and means actuated by said single means for automatically withdrawing the retaining means, other means for withdrawing the retaining means, a series of counters, and means for causing an actuation of those of said counters corresponding to the actuated counter-actuating means.

3. In a voting machine, the combination of a series of counter-actuating elements, and means for actuating any one of said elements, independent means for retaining a counter-actuating element in counter-actuating position, means actuated by said selecting means for automatically withdrawing the retaining means, means independent of the selecting mechanism for withdrawing the retaining means, a series of counters, and means for causing an actuation of those of said counters corresponding to the actuated counter-actuating means.

4. In a voting machine, the combination of a series of counter-actuating elements, and means for actuating any one of said elements, means for retaining a counter-actuating element in counter-actuating position, means actuated by said selecting means for automatically withdrawing the retaining means, means independent of the selecting mechanism for withdrawing the retaining means, a series of counters, and means for causing an actuation of those of said counters corresponding to the actuated counter-actuating means.

5. In a voting machine, the combination, of a series of counter-actuating elements, a single means for selecting and actuating any one of said elements, means for retaining the counter-actuating elements in counter-actuating position, a shaft arranged adjacent said retaining means, means carried by the selecting means for actuating said shaft, means carried by the shaft for engaging and withdrawing the retaining means to release previously actuated counter-actuating elements, a series of counters, and means for causing an actuation of those of said counters corresponding to the actuated counter-actuating means.

6. In a voting machine, the combination, of a series of counter-actuating elements, a series of catches one for each of said elements adapted to retain said elements in counter-actuating position, means arranged adjacent said catches and adapted to engage the same to withdraw them from retaining position, means for selecting and actuating the counter-actuating elements, and means operated by the selecting means for operating the releasing means.

7. In a voting machine, the combination, of a series of counter-actuating elements, a series of catches one for each of said elements adapted to retain said elements in counter-actuating position, a shaft provided with a series of means adapted to engage the catches and withdraw them from holding position, and means operated by the selecting means for operating said shaft to carry the same to catch-releasing position.

8. In a voting machine, the combination, of a series of counter-actuating elements, a series of catches, one for each of said elements and adapted to retain said elements in counter-actuating position, a shaft, ratchet wheels carried by said shaft adjacent the counter-actuating means, means carried by the shaft for engaging the retaining catches and withdrawing the same from retaining position, a selecting means for engaging the counter-actuating means and projecting the same to counter-actuating position, and means for engaging the ratchet wheels to actuate the shaft.

9. In a voting machine, the combination, of a series of counter-actuating elements, a series of catches, one for each of said elements and adapted to retain said elements in counter-actuating position, a shaft, ratchet wheels carried by said shaft adjacent the counter-actuating means, means carried by the shaft for engaging the retaining catches and withdrawing the same from retaining position, a single selecting means adapted to be brought into alinement with any one of the counter-actuating elements to project the same to counter-actuating position, and means carried by said single selecting means for engaging any one of said ratchet wheels to operate the shaft.

10. In a voting machine, the combination, of a series of counter-actuating elements, a single means for selecting and actuating any one of said elements, independent means for retaining the counter-actuating elements in counter-actuating position, and means actuated by said single means for automatically withdrawing the retaining means, other means for withdrawing the retaining means, a series of counters, means for causing an actuation of those of said counters corresponding to the actuated counter-actuating means, and an indicator actuated simultaneously with the actuation of the counter-actuating elements for indicating such actuation.

11. In a voting machine, the combination, of a series of counter-actuating elements, a single means for selecting and actuating any one of said elements, means for retaining the counter-actuating elements in counter-actuating position, and means actuated by said single means for automatically withdrawing the retaining means, other means for withdrawing the retaining means, a series of counters, means for causing an actuation of those of said counters corresponding to the actuated counter-actuating means, and an indicator actuated simultaneously with the actuation of the counter-actuating elements for indicating such actuation.

12. In a voting machine, the combination of a series of counter-actuating elements, and means for actuating any one of said elements, independent means for retaining a counter-actuating element in counter-actuating position, means actuated by said selecting means for automatically withdrawing the retaining means, means independent of the selecting mechanism for withdrawing the retaining means, a series of counters, means for causing an actuation of those of said counters corresponding to the actuated counter-actuating means, and an indicator actuated simultaneously with the actuation of the counter-actuating elements for indicating such actuation.

13. In a voting machine, the combination of a series of counter-actuating elements, and means for actuating any one of said elements, means for retaining a counter-actuating element in counter-actuating position, means actuated by said selecting means for automatically withdrawing the retaining means, means independent of the selecting mechanism for withdrawing the retaining means, a series of counters, means for causing an actuation of those of said counters corresponding to the actuated counter-actuating means, and an indicator actuated simultaneously with the actuation of the counter-actuating elements for indicating such actuation.

14. In a voting machine, the combination, of a series of counter-actuating elements, a single means for selecting and actuating any one of said elements, means for retaining the counter-actuating elements in counter-actuating position, a shaft arranged adjacent said retaining means, means carried by the selecting means for actuating said shaft, means carried by the shaft for engaging and withdrawing the retaining means to release previously actuated counter-actuating elements, a series of counters, means for causing an actuation of those of said counters corresponding to the actuated counter-actuating means, and an indicator actuated simultaneously with the actuation of the counter-actuating elements for indicating such actuation.

15. In a voting machine, the combination, of a series of counter-actuating elements, a series of catches one for each of said elements adapted to retain said elements in counter-actuating position, means arranged adjacent said catches and adapted to engage the same to withdraw them from retaining position, means for selecting and actuating the counter-actuating elements, means operated by the selecting means for operating the releasing means, and an indicator actuated simultaneously with the actuation of the counter-actuating elements for indicating such actuation.

16. In a voting machine, the combination, of a series of counter-actuating elements, a series of catches one for each of said elements adapted to retain said elements in counter-actuating position, a shaft provided with a series of means adapted to engage the catches and withdraw them from holding position, means operated by the selecting means for operating said shaft to carry the same to catch-releasing position, and an indicator actuated simultaneously with the actuation of the counter-actuating elements for indicating such actuation.

17. In a voting machine, the combination, of a series of counter-actuating elements, a series of catches, one for each of said elements and adapted to retain said elements in counter-actuating position, a shaft, ratchet wheels carried by said shaft adjacent the counter-actuating means, means carried by the shaft for engaging the retaining catches and withdrawing the same from retaining position, a selecting means for engaging the counter-actuating means and projecting the same to counter-actuating position, means for engaging the ratchet wheels to actuate the shaft, and an indicator actuated simultaneously with the actuation of the counter-actuating elements for indicating such actuation.

18. In a voting machine, the combination, of a series of counter-actuating elements, a series of catches, one for each of said elements and adapted to retain said elements in counter-actuating position, a shaft, ratchet wheels carried by said shaft adjacent the counter-actuating means, means carried by the shaft for engaging the retaining catches and withdrawing the same from retaining position, a single selecting means adapted to be brought into alinement with any one of the counter-actuating elements to project the same to counter-actuating position, means carried by said single selecting means for engaging any one of said ratchet wheels to operate the shaft, and an indicator actuated simultaneously with the actuation of the counter-actuating elements for indicating such actuation.

19. In a voting machine, the combination, of a group of a plurality of series of counter-actuating elements, retaining means for retaining any one of said counter-actuating elements in actuating position, means for withdrawing said retaining means from retaining position, means for selecting and actuating any one of said counter-actuating elements, means operated by the selecting means for actuating the means for withdrawing the retaining means, means for actuating selected counters and withdrawing the retaining means, and means independent of said actuating and withdrawing means for predetermining the possible number of selections of the counter-actuating means precedent to the action of the withdrawing means, whereby an excessive selective action will immediately release the retaining means of the previously actuated counter-actuating elements in the group.

20. In a voting machine, the combination of a group composed of a plurality of series of counter-actuating elements, means for selecting and actuating said counter-actuating elements, means for predetermining the number of counter-actuating elements to be actuated in the group, and means independent of the counter-actuating action and actuated by an excessive actuation of counter-actuating elements in the group for immediately withdrawing the previously actuated counter-actuating elements from counter-actuating position.

21. In a voting machine, the combination of a group composed of a plurality of series of counter-actuating elements, means for selecting and actuating said counter-actuating elements, means for predetermining the number of counter-actuating elements to be actuated in the group, means independent of the counter-actuating action and actuated by an excessive actuation of counter-actuating elements in the group for immediately withdrawing the previously actuated counter-actuating elements from counter-actuating position, and means controlled by the voter for restoring the group mechanism to normal.

22. In a voting machine, the combination, of a group composed of a plurality of series of counter-actuating elements, means for selecting and actuating said counter-actuating elements, means for predetermining the number of counter-actuating elements to be actuated in a group, and means independent of the counter-actuating action and for automatically immediately withdrawing previously actuated counter-actuating elements from counter-actuating position upon an excessive actuation of the selecting mechanism in a group.

23. In a voting machine, the combination, of a group composed of a plurality of series of counter-actuating elements, means for selecting and actuating said counter-actuating elements, means for predetermining the number of counter-actuating elements to be actuated in a group, means independent of the counter-actuating action and for automatically immediately withdrawing previously actuated counter-actuating elements from counter-actuating position upon an excessive actuation of the selected mechanism in a group, and means controlled by the voter for restoring the group mechanism to normal.

24. In a voting machine, the combination, of a group composed of a plurality of series of counters, a plurality of corresponding series of means actuated by the voter for selecting the counters to be actuated, means for actuating selected counters, and means independent of said actuating means and operated by an excessive action of said selecting means for automatically immediately withdrawing the entire previous selection of the group.

25. In a voting machine, the combination, of a group composed of a plurality of series of counters, a plurality of corresponding series of means actuated by the voter for selecting the counters to be actuated, means for actuating selected counters, means independent of said actuating means and operated by an excessive action of said selecting means for automatically immediately withdrawing the entire previous selection of the group, and means controlled by the voter for restoring the group mechanism to normal.

26. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate adjustable connections between the several shafts for connecting the same for simultaneous and uniform actuation whereby a predetermined number of actuations of said shafts is necessary before the catch-withdrawing means comes into operation, means for selecting and actuating the counter-actuating elements, and means operated by said selecting and actuating means for operating the connected shafts of the group step-by-step.

27. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate connections between the several shafts for connecting the same for simultaneous and uniform actuation whereby a predetermined number of actuations of said shafts is necessary before the catch-withdrawing means comes into operation, means for selecting and actuating the counter-actuating elements, and means operated by said selecting and actuating means for operating the connected shafts of the group step-by-step.

28. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate adjustable connections between the several shafts for connecting the same for simultaneous and uniform actuation whereby a predetermined number of actuations of said shafts is necessary before the catch-withdrawing means comes into operation, means for selecting and actuating the counter-actuating elements, means operated by said selecting and actuating means for operating the connected shafts of the group step-by-step, means for yieldingly urging said shafts to normal position, means for retaining said shafts in their step-by-step advancement, and means controlled by the voter for withdrawing said shaft retaining means subsequent to the actuation of said shafts that number of times predetermined for the group.

29. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate connections between the several shafts for connecting the same for simultaneous and uniform actuation whereby a predetermined number of actuations of said shafts is necessary before the catch-withdrawing means comes into operation, means for selecting and actuating the counter-actuating elements, means operated by said selecting and actuating means for operating the connected shafts of the group step-by-step, means for yieldingly urging said shafts to normal position, means for retaining said shafts in their step-by-step advancement, and means controlled by the voter for withdrawing said shaft retaining means subsequent to the actuation of said shafts that number of times predetermined for the group.

30. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate adjustable connections between the several shafts for connecting the same for simultaneous and uniform actuation whereby a predetermined number of actuations of said shafts is necessary before the catch-withdrawing means comes into operation, a plurality of selecting and actuating means one for each series of counter actuating elements, and means operated by each of said selecting and actuating means for advancing the shafts step-by-step.

31. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate connections between the several shafts for connecting the same for simultaneous and uniform actuation whereby a predetermined number of actuations of said shafts is necessary before the catch-withdrawing means comes into operation, a plurality of selecting and actuating means one for each series of counter actuating elements, and means operated by each of said selecting and actuating means for advancing the shafts step-by-step.

32. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate adjustable connections between the several shafts for connecting the same for simultaneous and uniform actuation whereby a predetermined number of actuations of said shafts is necessary before the catch-withdrawing means comes into operation, a plurality of selecting and actuating means one for each series of counter actuating elements, means operated by each of said selecting and actuating means for advancing the shafts step-by-step, means for yieldingly urging said shafts to normal position, means for retaining said shafts in their step-by-step advancement, and means controlled by the voter for withdrawing said shaft retaining means subsequent to the actuation of said shafts that number of times predetermined for the group.

33. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, intermediate connections between the several shafts for connecting the same for simultaneous and uniform actuation whereby a predetermined number of actuations of said shafts is necessary before the catch-withdrawing means comes into operation, a plurality of selecting and actuating means one for each series of counter actuating elements, means operated by each of said selecting and actuating means for advancing the shafts step-by-step, means for yieldingly urging said shafts to normal position, means for retaining said shafts in their step-by-step advancement, and means controlled by the voter for withdrawing said shaft retaining means subsequent to the actuation of said shafts that number of times predetermined for the group.

34. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, a gear carried by each of said shafts, a plurality of rack bars, means for causing any gear to engage any rack bar, whereby the shafts may be connected in desired groups for simultaneous actuation, means for selecting and actuating the counter-actuating elements, and means operated by said selecting and actuating means for operating the connected shafts of the group step-by-step.

35. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, a gear carried by each of said shafts, a plurality of rack bars, means for causing any gear to engage any rack bar, whereby the shafts may be connected in desired groups for simultaneous actuation, means for selecting and actuating the counter-actuating elements, means operated by said selecting and actuating means for operating the connected shafts of the group step-by step, means for yieldingly urging said shafts to normal position, means for retaining said shafts in their step-by-step advancement, and means controlled by the voter for withdrawing said shaft retaining means subsequent to the actuation of said shafts that number of times predetermined for the group.

36. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, a gear carried by each of said shafts, a plurality of rack bars, means for causing any gear to engage any rack bar, whereby the shafts may be connected in desired groups for simultaneous actuation, a plurality of selecting and actuating means for each series of counter actuating elements, and means operated by each of said selecting and actuating means for advancing the shafts step-by-step.

37. In a voting machine, the combination of a plurality of series of counter-actuating elements, a plurality of shafts one for each series, a plurality of catches for retaining the counter-actuating elements in counter-actuating position, means carried by each shaft for withdrawing the catches of its series from retaining position, a gear carried by each of said shafts, a plurality of rack bars, means for causing any gear to engage any rack bar, whereby the shafts may be connected in desired groups for simultaneous actuation, a plurality of selecting and actuating means one for each series of counter actuating elements, means operated by each of said selecting and actuating means for advancing the shafts step-by-step, means for yieldingly urging said shafts to normal position, means for retaining said shafts in their step-by-step advancement, and means controlled by the voter for withdrawing said shaft retaining means subsequent to the actuation of said shafts that number of times predetermined for the group.

38. In a voting machine, the combination, of a plurality of series of counter-actuating elements, a plurality of selecting mechanisms therefor, one for each series, means for actuating selected counters and means independent of said actuating means and operated by an excessive action of any of said selecting and actuating means for immediately returning previously actuated counter-actuating elements in its series to normal.

39. In a voting machine, the combination, of a plurality of series of counter-actuating elements, a plurality of selecting mechanisms therefor, one for each series, means for actuating selected counters, means independent of said actuating means and operated by an excessive action of any of said selecting and actuating means for immediately returning previously actuated counter-actuating elements in its series to normal, and interlocking mechanism between the plurality of selecting means for preventing simultaneous action of any two.

40. In a voting machine, the combination, with a multiplicity of counter-actuating elements arranged both in party and office series, of a plurality of selecting and actuating means, one for each office series, straight-ticket means for simultaneously actuating a party series of counter-actuating elements, and interlocking mechanism between the office selecting-means and the straight-ticket means for preventing actuation of any two and for locking the straight-ticket means against action subsequent to an actuation of any one of the office selecting means.

41. In a voting machine, the combination, with a multiplicity of counter-actuating elements arranged both in party and office series, of a plurality of selecting and actuating means, one for each office series, a plurality of straight-ticket means, one for each party series, for simultaneously actuating the counter-actuating elements of its party series, and a single straight-ticket selecting means for selecting and actuating any one of the straight-ticket actuators.

42. In a voting machine, the combination, with a multiplicity of counter-actuating elements arranged both in party and office series, of a plurality of selecting and actuating means, one for each office series, a plurality of straight-ticket means, one for each party series, for simultaneously actuating the counter-actuating elements of its party series, a single straight-ticket selecting means for selecting and actuating any one of the straight-ticket actuators, and interlocking mechanism between the office selecting means and the straight-ticket means for preventing simultaneous actuation of any two and for locking the straight-ticket means against action subsequent to an actuation of any one of the office selecting means.

43. In a voting machine, the combination with a suitable supporting frame, of a plurality of independent counter carriers movably mounted thereon, each of said carriers carrying a plurality of independent counters, and means for connecting said counter carriers for simultaneous movement.

44. In a voting machine, the combination with a suitable supporting frame, of a plurality of identical counter carriers arranged side by side thereon and independently attached to the frame for movement thereon, a plurality of independent counters carried by each of said carriers, and means for connecting said carriers for simultaneous movement.

45. In a voting machine, the combination of a multicandidate group composed of a plurality of series of counters, a corresponding plurality of series of means actuated by the voter for selecting the counters to be actuated, means for causing the actuation of selected counters and restoring their selecting means and means controlled by an improper operation of said selecting means and independent of said actuating and restoring means for automatically restoring all previously operated selecting means to control by the same voter.

46. In a voting machine, the combination of a multicandidate group composed of a plurality of series of counters, a corresponding plurality of series of means actuated by the voter for selecting the counters to be actuated, means for actuating the counters selected, a multicandidate interlock for said group, and means controlled by an improper operation of said selecting means and independent of the counter-actuating means for restoring all previously operated selecting means to control by the same voter and prior to the operation of the counters.

In witness whereof we have hereunto set our hands at Dayton, Ohio, January 14, 1907.

BENJAMIN F. EILERMAN.
CHARLES D. GRIMES.

Witnesses to the signatures of Benjamin F. Eilerman and Charles D. Grimes:
WILLIAM A. BROWN,
JOSEPH BRADY.

In witness whereof I have hereunto set my hand at Frankfort, Indiana, January 28, 1907.

THOMAS MAJOR.

Witnesses to the signature of Thomas Major:
MARVIN S. HUFFORD,
ADRIAN SMITH.